US010035608B2

United States Patent
Scacchi et al.

(10) Patent No.: US 10,035,608 B2
(45) Date of Patent: Jul. 31, 2018

(54) METHODS AND DEVICES FOR ASSISTING THE PILOTING OF AN AIRCRAFT DURING AT LEAST ONE FLIGHT PHASE HAVING A PLURALITY OF STEERING STEPS

(71) Applicant: AIRBUS OPERATIONS (S.A.S.), Toulouse (FR)

(72) Inventors: Pierre Scacchi, Toulouse (FR); Matthieu Mayolle, Tournefeuille (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 145 days.

(21) Appl. No.: 14/973,574

(22) Filed: Dec. 17, 2015

(65) Prior Publication Data
US 2016/0200448 A1    Jul. 14, 2016

(30) Foreign Application Priority Data
Jan. 8, 2015 (FR) ..................... 15 50165

(51) Int. Cl.
*B64D 43/02* (2006.01)
*G05D 1/04* (2006.01)
(Continued)

(52) U.S. Cl.
CPC ........... *B64D 43/02* (2013.01); *G01C 23/005* (2013.01); *G05D 1/042* (2013.01); *G05D 1/0607* (2013.01);
(Continued)

(58) Field of Classification Search
None
See application file for complete search history.

(56) References Cited

U.S. PATENT DOCUMENTS 7,965,202 B1    6/2011 Chiew
2003/0222887 A1*  12/2003 Wilkins, Jr. ......... G01O 23/005
                                                    345/618
(Continued)

FOREIGN PATENT DOCUMENTS

EP        2 244 215 A1    10/2010

OTHER PUBLICATIONS

French Search Report with Written Opinion for Application No. 1550165 dated Oct. 23, 2015.

*Primary Examiner* — Jonathan M Dager
*Assistant Examiner* — Garrett F Evans
(74) *Attorney, Agent, or Firm* — Jenkins, Wilson, Taylor & Hunt, P.A.

(57) ABSTRACT

A method and device for aiding piloting of an aircraft, during at least one flight phase including piloting steps. The device includes a unit for real-time acquisition of flight parameters of the aircraft, a calculation unit for calculating in real time with the parameters, for each of the piloting steps, a distance between current position of the aircraft and a position along a flight trajectory followed by the aircraft, at which the aircraft will reach the corresponding piloting step. At least one display unit is provided for displaying, in real time, characteristic signs each illustrating one of the piloting steps, the characteristic signs being integrated into the environment viewed with the aid of the screen and being positioned so as to make it possible to locate a place of the environment along the flight trajectory followed by the aircraft, at which the aircraft will reach the piloting step.

10 Claims, 2 Drawing Sheets

(51) Int. Cl.
*G01C 23/00* (2006.01)
*G05D 1/06* (2006.01)
*G08G 5/00* (2006.01)
*G08G 5/02* (2006.01)

(52) U.S. Cl.
CPC ........... *G05D 1/0653* (2013.01); *G08G 5/003* (2013.01); *G08G 5/0021* (2013.01); *G08G 5/0047* (2013.01); *G08G 5/0065* (2013.01); *G08G 5/025* (2013.01)

(56) References Cited

U.S. PATENT DOCUMENTS

2008/0065280 A1* 3/2008 Artini .................. G01O 23/005
  701/3
2010/0030405 A1 2/2010 He

* cited by examiner

METHODS AND DEVICES FOR ASSISTING THE PILOTING OF AN AIRCRAFT DURING AT LEAST ONE FLIGHT PHASE HAVING A PLURALITY OF STEERING STEPS

CROSS-REFERENCE TO RELATED APPLICATION

This application claims the benefit of and priority to French patent application No. 15 50165 filed on Jan. 8, 2015, the entire disclosure of which is incorporated by reference herein.

TECHNICAL FIELD

The present disclosure relates to a method and a device for aiding the piloting of an aircraft, in particular a transport airplane, during at least one flight phase of the aircraft including a plurality of piloting steps.

It applies to the field of aeronautics, civil or military, during the phases where the aircraft is in flight, in particular during the climb phase on takeoff or the approach phase on landing.

BACKGROUND

It is known that a flight phase, such as for example a climb phase on takeoff and an approach phase on landing, concentrates a relatively significant number of piloting steps to be followed for the pilot. The actions to be executed, decisions to be taken and monitoring to be ensured during these piloting steps together generate a significant workload. This load is furthermore increased in case of degraded conditions (meteorology, traffic, breakdown, etc.). By way of example, these actions may be:
on takeoff:
reduction in the thrust after initial climb;
retraction of the landing gears; and
retraction of the lift-enhancing systems during the acceleration phase;
on landing:
extension of the landing gears and of the lift-enhancing systems so as to progressively dissipate the energy and put the aircraft in a landing configuration; and
in case of precision approach required by poor visibility, a monitoring of the approach and a decision taking as regards whether to continue the approach or to go around as a function of the visibility level observed on passing a predefined height relative to the ground (called the decision height).

The instants of executions of actions or of taking of decisions are indicated to the pilot by a display most of the time in head-down mode on a standard screen of "PFD" ("Primary Flight Display") type, via a speed scale for the changes of configuration in particular, via an altitude scale for the thrust reduction on takeoff, or via a display of the height relative to the ground for the decision height in a precision approach.

The crew must therefore continually monitor these flight parameters (generally displayed in head-down mode on the PFD), while looking outside the cockpit to pilot the aircraft or monitor the progress of the approach and the available visibility level. The crew must therefore go to and fro visually between information displayed head-down decoupled from the outside and a monitoring of the outside environment for the piloting or monitoring tasks. In order to facilitate the pilot's task, it would be desirable to avoid such toing and froing.

Moreover, situation awareness, i.e. knowledge about the situation of the flight phase with different piloting steps with respect to the current situation, requires a complex mental process, in the course of which the crew must analyze information decorrelated from the outside environment (information regarding height or speed displayed on a screen in the cockpit) within the framework of active monitoring of the environment of the aircraft so as to take decisions (for example to cancel or continue the approach).

SUMMARY

An object of the present disclosure is to remedy this drawback. It relates to a method for aiding the piloting of an aircraft during at least one flight phase including a plurality of piloting steps, and an object of which is to facilitate awareness of the real situation for the pilot(s) in relation to the execution of the piloting steps.

For this purpose, according to the disclosure herein, a method for aiding the piloting of an aircraft comprises:
an acquisition step for carrying out the real-time acquisition of flight parameters of the aircraft;
a calculation step for calculating in real time, with the aid of the flight parameters, for each of the piloting steps, a distance D between the current position of the aircraft and a position along a flight trajectory followed by the aircraft, at which the latter will reach a corresponding piloting step; and
a display step for displaying in real time, on at least one screen of the flight deck, a plurality of characteristic signs, each of the characteristic signs illustrating one of the piloting steps, the characteristic signs being integrated into the environment viewed with the aid of the screen and being positioned so as to make it possible to locate a place of the environment along the flight trajectory followed by the aircraft, at which the latter will reach the piloting step.

Thus, by virtue of the disclosure herein, the pilot has at his or her disposal on at least one screen of the flight deck characteristic signs which are positioned so as to make it possible to locate the places in space along the flight trajectory followed by the aircraft, at which the latter will reach the piloting steps of the flight phase concerned. This information facilitates awareness by the pilot(s) of the real situation of the aircraft with respect to the remaining distance before reaching the piloting steps of the flight phase (takeoff, landing, etc.) and thus makes it possible to remedy the aforementioned drawback.

Moreover, characteristic signs such as these can allow the pilot to clearly identify the instant at which the corresponding piloting step is reached, for example by visualizing the passing of a virtual door, while displaying the characteristic signs in an appropriate way.

According to various embodiments of the disclosure herein, which can be taken together or separately:
at least one of the piloting steps is defined at a given value of an altitude parameter;
the altitude parameter is a height relative to the ground, the distance D being calculated, in the calculation step, with the aid of the following expression:

$$D = \left| \frac{Ht - H}{\sin(\gamma)} \right|$$

in which:

Ht is a height relative to the ground and corresponds to the given value of the altitude parameter;

H is a current height of the aircraft relative to the ground;

$\gamma$ is the current climb or descent slope of the aircraft relative to the ground and is one of the flight parameters;

D is the distance between the current position of the aircraft and the position of the point along the flight trajectory at which the aircraft will reach the height Ht; the altitude parameter is a pressure altitude, the distance D being calculated, in the calculation step, with the aid of the following expression:

$$D = \left|\frac{ZPt - ZP}{Vzb}\right| * Vgnd$$

in which:

ZPt is a pressure altitude and corresponds to the given value of the altitude parameter;

ZP is a current pressure altitude;

VZb is a current barometric vertical speed and is one of the flight parameters;

Vgnd is a current speed relative to the ground and is one of the flight parameters; and D is the distance between the current position of the aircraft and the position of the point along the flight trajectory at which the aircraft will reach the pressure altitude ZPt;

at least one of the piloting steps is defined at a given value of a speed parameter, the distance D being calculated, in the calculation step, with the aid of the following expressions:

if $J \neq 0: T = (\sqrt{A*A - 2*J*(V-Vt)} - A)/J$ $D = V*T + A/2*T*T + J/6*T*T*T$ if $J = 0$ and $A \neq 0: T = (Vt - V)/A$ $D = V*T + A/2*T*T$ in which:

Vt is an air speed corresponding to the given value of the speed parameter;

V is an air speed of the aircraft;

A is a ground acceleration of the aircraft and is one of the flight parameters;

J is a time derivative of the ground acceleration of the aircraft and is one of the flight parameters; and T is the time required to reach the air speed Vt on the basis of the flight parameters of the aircraft;

the piloting steps are decision steps or action steps;

in the display step, at least one of the characteristic signs is displayed:

as a conforming view on a screen forming part of a head-up device so that it is superimposed on the place of the environment to be located, which is visible through the screen; and/or on a screen forming part of a head-down device which displays at least one view of a part of the environment in front of the aircraft and is positioned as a view conforming with the appropriate place of that part of the environment which is reproduced on this screen.

The present disclosure also relates to a device for aiding the piloting of an aircraft during a flight phase comprising a plurality of piloting steps and which is particularly suitable for all the phases where the aircraft is in flight and in particular during the climb on takeoff or during the approach on landing.

According to the disclosure herein, the device is noteworthy in that it comprises:

a unit for real-time acquisition of flight parameters of the aircraft;

a calculation unit configured to calculate, in real time, with the aid of the parameters, for each of the piloting steps, a distance between the current position of the aircraft and a position along a flight trajectory followed by the aircraft, at which the latter will reach the corresponding piloting step; and at least one display unit configured to display, in real time, on at least one screen of the flight deck, a plurality of characteristic signs, each of the characteristic signs illustrates one of the piloting steps, the characteristic signs being integrated into the environment viewed with the aid of the screen and being positioned so as to make it possible to locate a place of the environment along the flight trajectory followed by the aircraft, at which the latter will reach the piloting step.

The present disclosure relates furthermore to an aircraft, in particular a transport airplane, which is provided with such a device for aiding piloting.

BRIEF DESCRIPTION OF THE DRAWINGS

The appended figures will elucidate the manner in which the disclosure herein may be embodied. In these figures, identical references designate similar elements.

DETAILED DESCRIPTION

Figure 1:
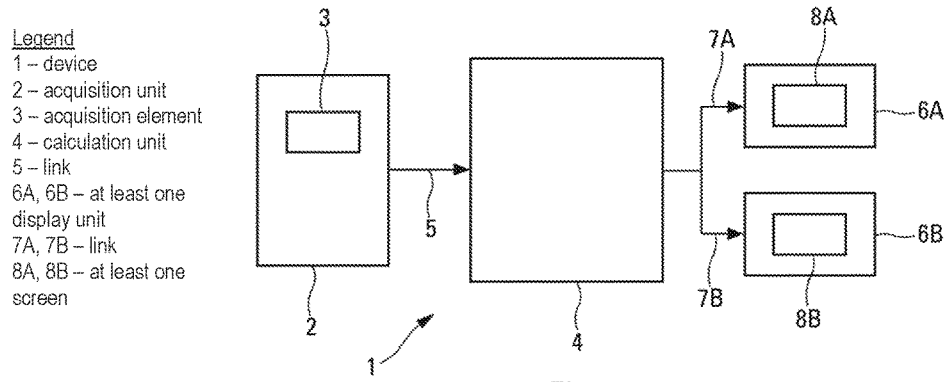
FIG. 1 is the schematic diagram of a device for aiding piloting which illustrates an embodiment of the disclosure herein.

A device 1 for aiding the piloting of an aircraft (not represented), in particular of a transport airplane, is represented schematically in FIG. 1. This device 1 aids the pilot of the aircraft while piloting during at least one phase of in-flight travel of the aircraft. It may entail for example climb on takeoff or final approach. The flight phases include a plurality of piloting steps. In each of these steps, the pilot must take at least one decision and/or perform at least one action.

According to the disclosure herein, the device 1, which is onboard the aircraft, comprises, as represented in FIG. 1:

an acquisition unit 2 comprising an acquisition element 3 able to acquire, in real time, flight parameters, specified hereinbelow, of the aircraft;

a calculation unit 4 which is connected by way of a link 5 to the acquisition unit 2 and which is configured to calculate, with the aid of the flight parameters received from it, for each of the piloting steps, a distance D between the current position of the aircraft (in particular the position of the center of gravity of the aircraft at the current instant) and a position along the flight trajectory followed by the aircraft, at which the latter will reach the corresponding piloting step; and at least one display unit 6A, 6B which is connected by way of a link 7A, 7B to the calculation unit 4 and which is configured to display, on at least one screen 8A, 8B of the flight deck, characteristic signs S1 and S2 which illustrate the corresponding piloting steps. These characteristic signs S1 and S2 are integrated into the environment viewed with the aid of the screen 8A, 8B, and are positioned so as to make it possible to locate the place in space along the flight trajectory followed by the aircraft, at which the latter will reach the corresponding piloting step.

An object of the device 1 is therefore:

to calculate, for each of the piloting steps to be displayed (head-up or head-down) of the current flight phase, the distance D between the current position of the aircraft and the position in space along the envisaged trajectory of the aircraft at which the latter will reach the piloting step in question; and to display (head-up or head-down) the position of the point where this piloting step will be reached in the frame of the display.

Figure 2:
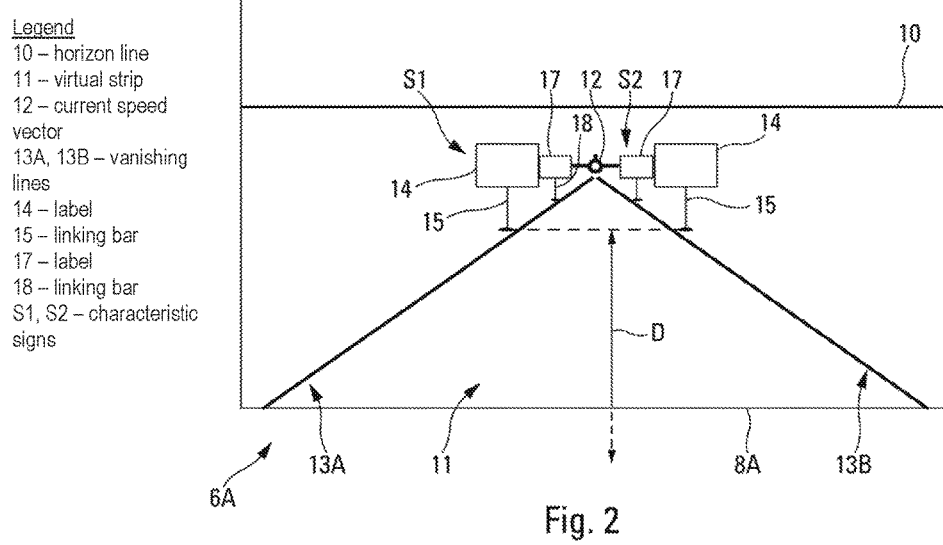
FIG. 2 schematically illustrates a first exemplary display able to be implemented by such a device for aiding piloting.

The present disclosure can be applied to various display units 6A, 6B and screens 8A, 8B. Preferably, the characteristic sign(s) S1, S2, is (are) displayed as a conforming view on a screen 8A forming part of a head-up device so that, as represented in FIG. 2 by way of illustration, the characteristic signs S1 and S2 are superimposed on the places in space to be located, which are visible through the screen 8A. This projection of the speed information is carried out in a preferential manner with the aid of a device of HUD ("Head Up Display") type or some other head-up visualization device making it possible to superimpose under conforming vision the information about speed with respect to the outside. The head-up device 6A can also comprise standard systems, such as:

a synthetic vision system SVS, which carries out a synthetic reconstruction of certain elements of the environment, for example the contours of the runway; and an enhanced vision system EVS, using optical sensors or radar to enhance the pilot's outside view.

The characteristic sign(s) S1, S2, can also be displayed as a conforming view, on a head-down display, for example:

under SVS vision. By representing the runway in a synthetic manner, it is possible to display significant piloting steps directly in the reconstructed synthetic environment; or under EVS vision. Piloting steps which are significant for the pilot are superimposed on an image captured by a sensor (optical, infrared, millimetric or microwave based in particular).

These various display units being complementary, the device 1 can use several of them simultaneously, so as to allow the pilot to best apprehend the situation of the aircraft.

Each piloting step is displayed at the level of a characteristic sign S1, S2 situated at the distance D from the current position of the aircraft. This distance D, for each of the piloting steps displayed, is calculated by way of a calculation parameter. This calculation parameter is for example an altitude parameter such as a height relative to the ground or a pressure altitude, or else a speed parameter such as an air speed of the aircraft. The piloting steps are thus defined at a given value of a height parameter or of a speed parameter.

FIG. 2 shows an exemplary display on a screen 8A of a display unit 6A corresponding to a head-up device. In a standard manner, this screen 8A is transparent and makes it possible to view the external environment, in this instance in front of the aircraft.

For the sake of clarity of the drawing and of ease of reading, this environment has been represented in a pared down manner in FIG. 2. Represented simply therein are:

a horizon line 10;

a symbol 12 illustrating the position of the speed vector of the aircraft; and a representation of the predicted flight trajectory of the airplane, for example in the form of a virtual strip 11 represented by two vanishing lines 13A, 13B.

The virtual strip 11 corresponds for example to the predicted trajectory of the aircraft ("scenic airway"). This virtual strip is positioned under the aircraft at a height consistent with an aircraft rolling on a runway, and its direction is that of the current speed vector 12 of the aircraft (termed "bird"). Optionally, if the aircraft is in autopilot mode and therefore if the guidance trajectory is known a priori, the virtual strip 11 displayed could follow this trajectory, which would make it possible in particular to cover the case of curved approach trajectories.

On this screen 8A, the display unit 6A also displays the characteristic signs S1 and S2.

The characteristic signs S1 and S2 corresponding to the various piloting steps, for example the decision height and 100 feet before the decision height, are exhibited on the vanishing lines 13A, 13B.

In the example represented, the characteristic sign S1 comprises on either side of the virtual strip 11 a label 14 that can specify the piloting step and each time a linking bar 15 between this label 14 and the vanishing lines 13A, 13B. Likewise, the characteristic sign S2 comprises on either side of the virtual strip 11 a label that can specify the piloting step and each time a linking bar 18 between this label 17 and the vanishing lines 13A, 13B.

Figure 3:
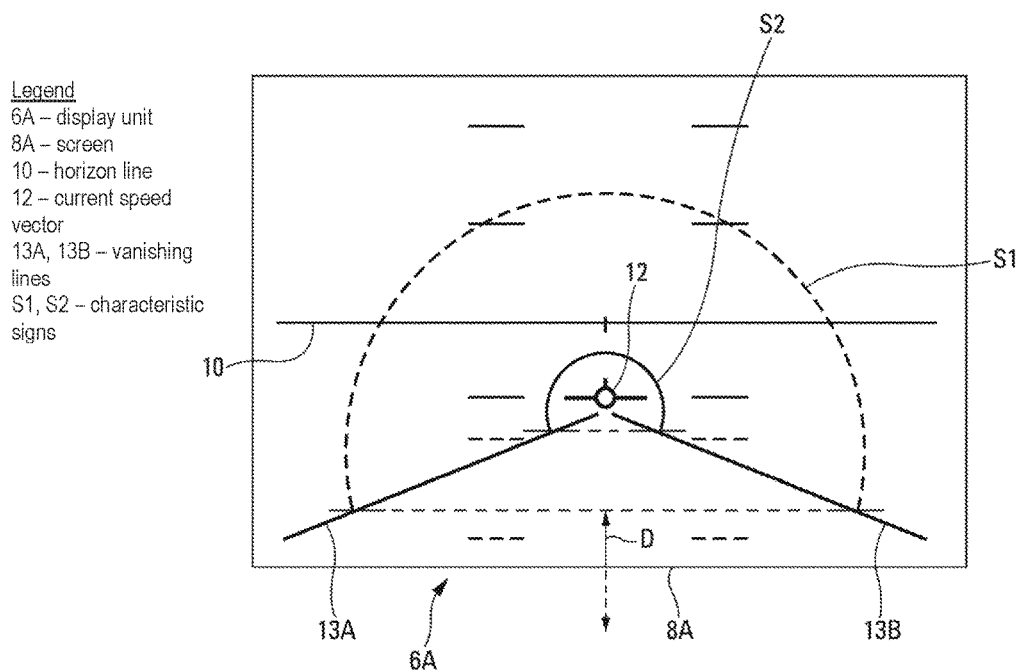
FIG. 3 schematically illustrates a second exemplary display able to be implemented by such a device for aiding piloting.

The characteristic signs S1, S2 can comprise virtual doors, as illustrated in FIG. 3, allowing the pilot to clearly identify the instant at which the corresponding piloting step is reached, namely upon passing the virtual door considered.

The display of FIGS. 2 and 3 could also be a display carried out head-down with the aid of an SVS system or of an EVS system, with a non-transparent screen and the representation of the environment in a synthetic manner or with the aid of an image of a sensor (optical, infrared, millimetric or microwave based in particular).

In the example where the calculation parameter is a height of the aircraft relative to the ground, the device 1 can display the significant piloting steps which are useful to the crew on landing, such as for example the decision height Ht and the height H1 corresponding to 100 feet above the decision height. In this case, if the aircraft maintains its current climb or descent slope γ relative to the ground, it will arrive at the heights H1, Ht at the level of the corresponding characteristic signs S1, S2.

This height information is displayed directly in the environment under conforming vision, as represented by way of example in FIG. 2, by displaying the significant heights defining at least the piloting steps useful to the crew at certain points of the environment outside the aircraft, for example on virtual panels set at the distance D from the aircraft.

When the calculation parameter, in this instance an altitude parameter, is the height of the aircraft relative to the ground, the calculation unit 4 calculates the distance D, in the calculation step, with the aid of the following expression:

$$D = \left| \frac{Ht - H}{\sin(\gamma)} \right|$$

in which:
Ht is a height relative to the ground and corresponds to the given value of the altitude parameter;
H is a current height of the aircraft relative to the ground;
γ is the current climb or descent slope of the aircraft relative to the ground and is one of the flight parameters; and
D is the distance between the current position of the aircraft and the position of the point along the flight trajectory at which the aircraft will reach the height Ht.

In the example where the calculation parameter is a pressure altitude of the aircraft relative to the ground, the device 1 can display the significant piloting steps which are useful to the crew on landing, such as for example a pressure decision altitude ZPt and a predetermined pressure altitude Z1 situated before the pressure decision altitude. In this case, if the aircraft maintains its current barometric vertical speed and its current speed relative to the ground, it will arrive at the pressure altitude Z1, ZPt at the level of the corresponding characteristic signs S1, S2.

This height information is displayed directly in the environment under conforming vision, as represented by way of example in FIG. 2, by displaying the significant pressure altitudes defining at least the piloting steps useful to the crew at certain points of the environment outside the aircraft, for example on virtual panels set at the distance D from the aircraft.

When the calculation parameter, in this instance an altitude parameter, is the pressure altitude of the aircraft, the calculation unit 4 calculates the distance D, in the calculation step, with the aid of the following expression:

$$D = \left| \frac{ZPt - ZP}{Vzb} \right| * Vgnd$$

in which:
ZPt is a pressure altitude and corresponds to the given value of the altitude parameter;
ZP is a current pressure altitude;
VZb is a current barometric vertical speed and is one of the flight parameters;
Vgnd is a current speed relative to the ground and is one of the flight parameters; and
D is the distance between the current position of the aircraft and the position of the point along the flight trajectory at which the aircraft will reach the pressure altitude ZPt.

In the example where the calculation parameter is an air speed, the device 1 can display the following significant piloting steps, which are useful to the crew:
on takeoff:
retraction of the landing gears; and
retraction of the lift-enhancing systems during the acceleration phase;
on landing, extension of the landing gears and of the lift-enhancing systems so as to progressively dissipate the energy and put the aircraft in a landing configuration. In this case, if the aircraft maintains its current kinetic conditions (speed, acceleration, jerk), it will arrive at the speed at which the extension of the flaps or slats must be instructed at the level of the corresponding characteristic signs S1, S2.

This speeds information is displayed directly in the environment under conforming vision, as represented by way of example in FIG. 2, by displaying the significant speeds defining the piloting steps useful to the crew at certain points of the environment outside the aircraft, for example on virtual panels set at the distance D from the aircraft.

When the calculation parameter is the air speed of the aircraft, the calculation unit 4 calculates the distance D, in the calculation step, with the aid of the following expressions:

$$\text{if } J \neq 0 : T = (\sqrt{A*A - 2*J*(V - Vt)} - A)/J$$

$$D = V*T + A/2*T*T + J/6*T*T*T$$

$$\text{if } J = 0 \text{ and } A \neq 0 : T = (Vt - V)/A$$

$$D = V*T + A/2*T*T$$

in which:
Vt is an air speed corresponding to the given value of the speed parameter;
V is an air speed of the aircraft;
A is a ground or air acceleration of the aircraft and is one of the flight parameters;
J is a time derivative of the ground or air acceleration of the aircraft and is one of the flight parameters; and
T is the time required to reach the air speed Vt on the basis of the flight parameters of the aircraft.

Furthermore, if A=0, the distance D is not calculated, and no characteristic sign relating to the speed Vt considered is displayed on the screen 8A, 8B.

The speed information serves to position the speed Vt along the speed scale. Hence, to display a speed Vt in the air frame, it is appropriate to measure and use an air speed (or indicated speed) of IAS type so that the speeds are mutually consistent.

The aforementioned device 1 affords the following advantages, doing so over all the phases where the aircraft is in flight and in particular during approach or climb on takeoff:
a gain in effectiveness of perception by the pilot of the piloting steps (of actions or of decisions) by displaying them in a conforming manner, that is to say by integrating this information into the environment viewed by the pilot (better anticipation, reduction in the associated cognitive task, reduction in the pilot workload),
a gain in precision and in reaction time with respect to the carrying out of actions or taking of decisions, and avoid taking late decisions (for example at the decision height to continue the approach or to go around).

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of aiding piloting of an aircraft, during at least one flight phase including a plurality of piloting steps, a piloting step being a decision step or an action step, the method comprising:
    an acquisition step for carrying out real-time acquisition of flight parameters of the aircraft;
    a display step for displaying in real time, on at least one screen of a flight deck, a plurality of characteristic signs, each of the characteristic signs illustrating one of the piloting steps, wherein displaying the characteristic signs includes displaying a representation of the predicted flight trajectory of the airplane in a form of a virtual strip and, for each piloting step of at least a decision piloting step and an action piloting step, displaying on either side of the virtual strip a virtual panel including a label that specifies the piloting step and height, pressure altitude, or speed information for the piloting step; and
    a calculation step for calculating in real time, with aid of the flight parameters, for each of the piloting steps, a distance between current position of the aircraft and a position along a flight trajectory followed by the aircraft, at which the aircraft will reach a corresponding piloting step, and wherein in the display step the characteristic signs are integrated into environment viewed with aid of the screen and are positioned to locate a place of the environment along the flight trajectory followed by the aircraft, at which the aircraft will reach the piloting step.

2. The method of claim 1,
wherein at least one of the piloting steps is defined at a given value of an altitude parameter.

3. The method of claim 2,
wherein the altitude parameter is a height relative to the ground, the distance D being calculated, in the calculation step, with aid of the following expression:

$$D = \left| \frac{Ht - H}{\sin(\gamma)} \right|$$

in which:
    Ht is a height relative to the ground and corresponds to the given value of the altitude parameter;
    H is a current height of the aircraft relative to the ground;
    $\gamma$ is the current climb or descent slope of the aircraft relative to the ground and is one of the flight parameters; and
    D is the distance between the current position of the aircraft and the position of the point along the flight trajectory at which the aircraft will reach the height Ht.

4. The method of claim 2, wherein the altitude parameter is a pressure altitude, the distance D being calculated, in the calculation step, with the aid of the following expression:

$$D = \left| \frac{ZPt - ZP}{Vzb} \right| * Vgnd$$

in which:
    ZPt is a pressure altitude and corresponds to the given value of the altitude parameter;
    ZP is a current pressure altitude and corresponds to the altitude parameter;
    VZb is a current barometric vertical speed and is one of the flight parameters;
    Vgnd is a current speed relative to the ground and is one of the flight parameters; and
    D is the distance between the current position of the aircraft and the position of the point along the flight trajectory at which the aircraft will reach the pressure altitude ZPt.

5. The method of claim 1, wherein at least one of the piloting steps is defined at a given value of a speed parameter, the distance D being calculated, in the calculation step, with aid of the following expressions:

if $J \neq 0: T = (\sqrt{A*A - 2*J*(V-Vt)} - A)/J$ $D = V*T + A/2*T*T + J/6*T*T*T$ if $J = 0$ and $A \neq 0: T = (Vt - V)/A$ $D = V*T + A/2*T*T$ in which:
    Vt is an air speed corresponding to the given value of the speed parameter;
    V is an air speed of the aircraft;
    A is a ground or air acceleration of the aircraft and is one of the flight parameters;
    J is a time derivative of the ground or air acceleration of the aircraft and is one of the flight parameters; and
    T is the time required to reach the air speed Vt on the basis of the flight parameters of the aircraft.

6. The method of claim 1,
wherein in the display step, at least one of the characteristic signs is displayed:
    as a conforming view on a screen forming part of a head-up device so that it is superimposed on the place of the environment to be located, which is visible through the screen; and/or
    on a screen forming part of a head-down device which displays at least one view of a part of the environment in front of the aircraft and is positioned as a view conforming with the appropriate place of that part of the environment which is reproduced on this screen.

7. A device for aiding piloting of an aircraft, during at least one flight phase including a plurality of piloting steps, a piloting step being a decision step or an action step, the device comprising:
    a unit for real-time acquisition of flight parameters of the aircraft;
    at least one display unit configured to display, in real time, on at least one screen of the flight deck, a plurality of characteristic signs, each of the characteristic signs illustrating one of the piloting steps, wherein displaying the characteristic signs includes displaying a representation of the predicted flight trajectory of the airplane in a form of a virtual strip and, for each piloting step of at least a decision piloting step and an action piloting step, displaying on either side of the virtual strip a virtual panel including a label that specifies the piloting step and height, pressure altitude, or speed information for the piloting step; and a calculation unit configured to calculate, in real time, with aid of the flight parameters, for each of the piloting steps, a distance between current position of the aircraft and a position along a flight trajectory followed by the aircraft, at which the aircraft will reach a corresponding piloting step, and wherein the display unit is configured to integrate the characteristic signs into the environment viewed with aid of the screen and to position them to locate a place of the environment along the flight trajectory followed by the aircraft, at which the aircraft will reach the piloting step.

8. An aircraft comprising a device for aiding piloting according to claim 7.

9. A method of aiding piloting of an aircraft, during at least one flight phase including a plurality of piloting steps, a piloting step being a decision step or an action step, the method comprising:

an acquisition step for carrying out real-time acquisition of flight parameters of the aircraft;

a display step for displaying in real time, on at least one screen of a flight deck, a plurality of characteristic signs, each of the characteristic signs illustrating one of the piloting steps; and a calculation step for calculating in real time, with aid of the flight parameters, for each of the piloting steps, a distance between current position of the aircraft and a position along a flight trajectory followed by the aircraft, at which the aircraft will reach a corresponding piloting step, and wherein in the display step the characteristic signs are integrated into environment viewed with aid of the screen and are positioned to locate a place of the environment along the flight trajectory followed by the aircraft, at which the aircraft will reach the piloting step;

wherein at least one of the piloting steps is defined at a given value of an altitude parameter; and wherein the altitude parameter is a pressure altitude, the distance D being calculated, in the calculation step, with the aid of the following expression:

$$D = \left| \frac{ZPt - ZP}{Vzb} \right| * Vgnd$$

in which:
   ZPt is a pressure altitude and corresponds to the given value of the altitude parameter;
   ZP is a current pressure altitude and corresponds to the altitude parameter;
   VZb is a current barometric vertical speed and is one of the flight parameters;
   Vgnd is a current speed relative to the ground and is one of the flight parameters; and
   D is the distance between the current position of the aircraft and the position of the point along the flight trajectory at which the aircraft will reach the pressure altitude ZPt.

10. A method of aiding piloting of an aircraft, during at least one flight phase including a plurality of piloting steps, a piloting step being a decision step or an action step, the method comprising:

an acquisition step for carrying out real-time acquisition of flight parameters of the aircraft;

a display step for displaying in real time, on at least one screen of a flight deck, a plurality of characteristic signs, each of the characteristic signs illustrating one of the piloting steps; and a calculation step for calculating in real time, with aid of the flight parameters, for each of the piloting steps, a distance between current position of the aircraft and a position along a flight trajectory followed by the aircraft, at which the aircraft will reach a corresponding piloting step, and wherein in the display step the characteristic signs are integrated into environment viewed with aid of the screen and are positioned to locate a place of the environment along the flight trajectory followed by the aircraft, at which the aircraft will reach the piloting step;

wherein at least one of the piloting steps is defined at a given value of a speed parameter, the distance D being calculated, in the calculation step, with aid of the following expressions:

if $J \neq 0: T = (\sqrt{A*A - 2*J*(V-Vt)} - A)/J$ $D = V*T + A/2*T*T + J/6*T*T*T$ if $J = 0$ and $A \neq 0: T = (Vt - V)/A$ $D = V*T + A/2*T*T$ in which:
   Vt is an air speed corresponding to the given value of the speed parameter;
   V is an air speed of the aircraft;
   A is a ground or air acceleration of the aircraft and is one of the flight parameters;
   J is a time derivative of the ground or air acceleration of the aircraft and is one of the flight parameters; and
   T is the time required to reach the air speed Vt on the basis of the flight parameters of the aircraft.

* * * * *